United States Patent
Muzaffer

(10) Patent No.: US 10,518,648 B2
(45) Date of Patent: Dec. 31, 2019

(54) REMOTE RECHARGEABLE MONITORING SYSTEM AND METHOD

(71) Applicant: WEBASTO CHARGING SYSTEMS, INC., Simi Valley, CA (US)

(72) Inventor: Rehan Muzaffer, Corona, CA (US)

(73) Assignee: WEBASTO CHARGING SYSTEMS, INC., Simi Valley, CA (US)

( * ) Notice: Subject to any disclaimer, the term of this patent is extended or adjusted under 35 U.S.C. 154(b) by 0 days.

(21) Appl. No.: 15/469,752

(22) Filed: Mar. 27, 2017

(65) Prior Publication Data

US 2017/0197513 A1 Jul. 13, 2017

Related U.S. Application Data

(63) Continuation of application No. 12/846,787, filed on Jul. 29, 2010, now Pat. No. 9,608,460.

(Continued)

(51) Int. Cl.
*B60L 11/18* (2006.01)
*H02J 7/00* (2006.01)
(Continued)

(52) U.S. Cl.
CPC ......... *B60L 11/1816* (2013.01); *B60L 3/0046* (2013.01); *B60L 3/12* (2013.01);
(Continued)

(58) Field of Classification Search
CPC .............. B60L 11/1816; B60L 11/1864; B60L 2240/545; B60L 2240/547;
(Continued)

(56) References Cited

U.S. PATENT DOCUMENTS 5,563,491 A 10/1996 Tseng
6,842,707 B2 1/2005 Raichle et al.
(Continued)

FOREIGN PATENT DOCUMENTS

CN 101192691 A 6/2008
CN 201142022 Y 10/2008
WO 2008/074008 A2 6/2008

OTHER PUBLICATIONS

Notification of Fifth Office Action, dated Mar. 23, 2016, issued in Chinese Patent Application No. 201080043988.X, 15 pages.
(Continued)

*Primary Examiner* — Tyler J Lee
(74) *Attorney, Agent, or Firm* — Nixon Peabody LLP; Jeffrey L. Costellia

(57) ABSTRACT

A system including a remote server connected over a network to a battery charger is configured to track usage of rechargeable batteries. Values of various sensed parameters of a battery, such as temperature, charge, current, and water level are stored with the battery and uploaded to the remote server, either wirelessly or through the network, and either directly from the battery or by way of the battery charger when the battery is coupled to the battery charger. The remote server operates to determine the condition, value and warranty of the battery based on the sensed parameters and on the user history of the battery. Alerts and warnings can be forwarded to the user and/or an enterprise manager or shop manager in the case of enterprise vehicles such as warehouses operating multiple electric forklifts, or rental car agencies, so that multiple rechargeable batteries can be readily tracked, monitored and maintained.

17 Claims, 8 Drawing Sheets

Related U.S. Application Data

(60) Provisional application No. 61/230,088, filed on Jul. 30, 2009.

(51) Int. Cl.

| | | |
|---|---|---|
| *B60L 3/00* | (2019.01) | |
| *B60L 3/12* | (2006.01) | |
| *B60L 53/14* | (2019.01) | |
| *B60L 53/65* | (2019.01) | |
| *B60L 53/10* | (2019.01) | |
| *B60L 58/16* | (2019.01) | |
| *B60L 58/21* | (2019.01) | |
| *H01M 10/42* | (2006.01) | |

(52) U.S. Cl.
CPC .............. *B60L 53/11* (2019.02); *B60L 53/14* (2019.02); *B60L 53/65* (2019.02); *B60L 58/16* (2019.02); *B60L 58/21* (2019.02); *H02J 7/0021* (2013.01); *H02J 7/0047* (2013.01); *B60L 2240/545* (2013.01); *B60L 2240/547* (2013.01); *B60L 2240/549* (2013.01); *B60L 2240/622* (2013.01); *B60L 2240/662* (2013.01); *B60L 2240/70* (2013.01); *B60L 2250/10* (2013.01); *H01M 10/42* (2013.01); *H02J 2007/006* (2013.01); *H02J 2007/0098* (2013.01); *Y02T 10/7005* (2013.01); *Y02T 10/7061* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC ......... B60L 2240/549; B60L 2240/622; B60L 2240/662; H02J 2007/0098; H02J 7/0021
USPC ............................................................ 701/2
See application file for complete search history.

(56) References Cited

U.S. PATENT DOCUMENTS

| | | |
|---|---|---|
| 6,911,804 B2 | 6/2005 | Mori |
| 7,184,905 B2 | 2/2007 | Stefan |
| 7,227,335 B2 | 6/2007 | Sakakibara et al. |
| 7,772,850 B2 | 8/2010 | Bertness |
| 7,774,151 B2 | 8/2010 | Bertness |
| 8,180,584 B2 | 5/2012 | Raichle et al. |
| 8,203,310 B2 | 6/2012 | McCabe |
| 8,344,685 B2 | 1/2013 | Bertness et al. |
| 2002/0138772 A1 | 9/2002 | Crawford et al. |
| 2004/0000891 A1 | 1/2004 | Kurt et al. |
| 2005/0071093 A1 | 3/2005 | Stefan |
| 2006/0170397 A1 | 8/2006 | Srinivasan et al. |
| 2007/0139017 A1 | 6/2007 | Marchand et al. |
| 2007/0229032 A1 | 10/2007 | Elder et al. |
| 2008/0007431 A1 | 1/2008 | Jacques |
| 2008/0108370 A1* | 5/2008 | Aninye ............... B60R 25/1004 455/456.1 |
| 2008/0297104 A1 | 12/2008 | Rao et al. |
| 2009/0021385 A1 | 1/2009 | Kelty et al. |
| 2009/0052889 A1 | 2/2009 | McKelvey et al. |
| 2009/0177595 A1 | 7/2009 | Dunlap et al. |
| 2009/0234599 A1* | 9/2009 | Watanabe ........... B60L 11/1816 702/63 |
| 2010/0033321 A1* | 2/2010 | Kaminski ............ A43B 3/0005 340/539.13 |
| 2010/0114798 A1* | 5/2010 | Sirton ................. B60L 11/1816 705/412 |
| 2010/0149030 A1* | 6/2010 | Verma ................ G08B 13/1436 342/357.64 |

OTHER PUBLICATIONS

Office Action, dated Dec. 16, 2015, issued in Canadian Application No. 2,769,649 (5 pages).
Fourth Office Action, dated Sep. 28, 2015, in Chinese Patent Application No. 201080043988.X.
English translation of Office Action issued in CN Patent Application No. 201080043988.X dated Aug. 6, 2014, 2 pages total.
Canadian Examination Report issued in CA Patent Application No. 2,769,649 dated Dec. 18, 2014, 3 pgs.
AMETEK Prestolite Power, CDAC Fleet Management System for Industrial Battery Chargers, Data Sheet; 1317, Troy, Ohio.
INTELLEFLEET, Wireless Fleet Management Systems, IUV Technology Presentation, Sep. 7-8, 2005 Denver, Colorado, http://www.intelleFLEET.com.
POSINET (PosiCharge), Web: Fleet Performance Management for your Fast-Charged Vehicles, Aerovironment Inc., 2007.
ISR and Written Opinion PCT/US10/44026 dated Sep. 23, 2010.
Canadian Examination Report for Application No. 2,769,649 dated Mar. 15, 2013.
Notice of Allowance dated Sep. 18, 2017 issued in a Canadian Patent Application No. 2,769,649.
Extended European Search Report for European Patent Application No. 10 805 149.1, dated Nov. 3, 2017, 6 pages.

* cited by examiner

REMOTE RECHARGEABLE MONITORING SYSTEM AND METHOD

CROSS-REFERENCE TO RELATED APPLICATIONS

This application is a Continuation of U.S. patent application Ser. No. 12/846,787, filed Jul. 29, 2010, now U.S. Pat. No. 9,608,460, Issued Mar. 28, 2017, which claims priority to Provisional Application No. 61/230,088, filed Jul. 30, 2009, now expired, the disclosure of which is incorporated herein by reference as if set forth fully herein.

TECHNICAL FIELD

The present disclosure relates generally to monitoring of batteries, such as rechargeable vehicle batteries.

BACKGROUND

As environmental concerns mount, electric vehicles become more popular and their use more ubiquitous. Batteries used to power electric vehicles require regular maintenance, and tracking this maintenance, particular when multiple vehicles are involved, can be burdensome. Automating this process would relieve this burden. In addition, since batteries have limited life spans and, as a commercial commodity, have resale and warranty values that are functions of their remaining life and of the manner in which they are operated, tracking these parameters can yield economic benefits.

Overview

As described herein, a battery charging system includes a battery charger operable to deliver power from a power source to a rechargeable battery coupleable to the battery charger, and a remote server coupleable to the battery charger through a network and including a communication device configured to receive operational information relating to the battery.

Also as described herein, a method for monitoring a battery using sensed operational information of the battery includes receiving the sensed operational information at a server remote from the battery, and determining a battery characteristic using the received sensed operational information.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The term "exemplary" when used herein means serving as an example, instance or illustration. Any embodiment or arrangement described herein as "exemplary" is not necessarily to be construed as preferred or advantageous over other embodiments.

Figure 1A:
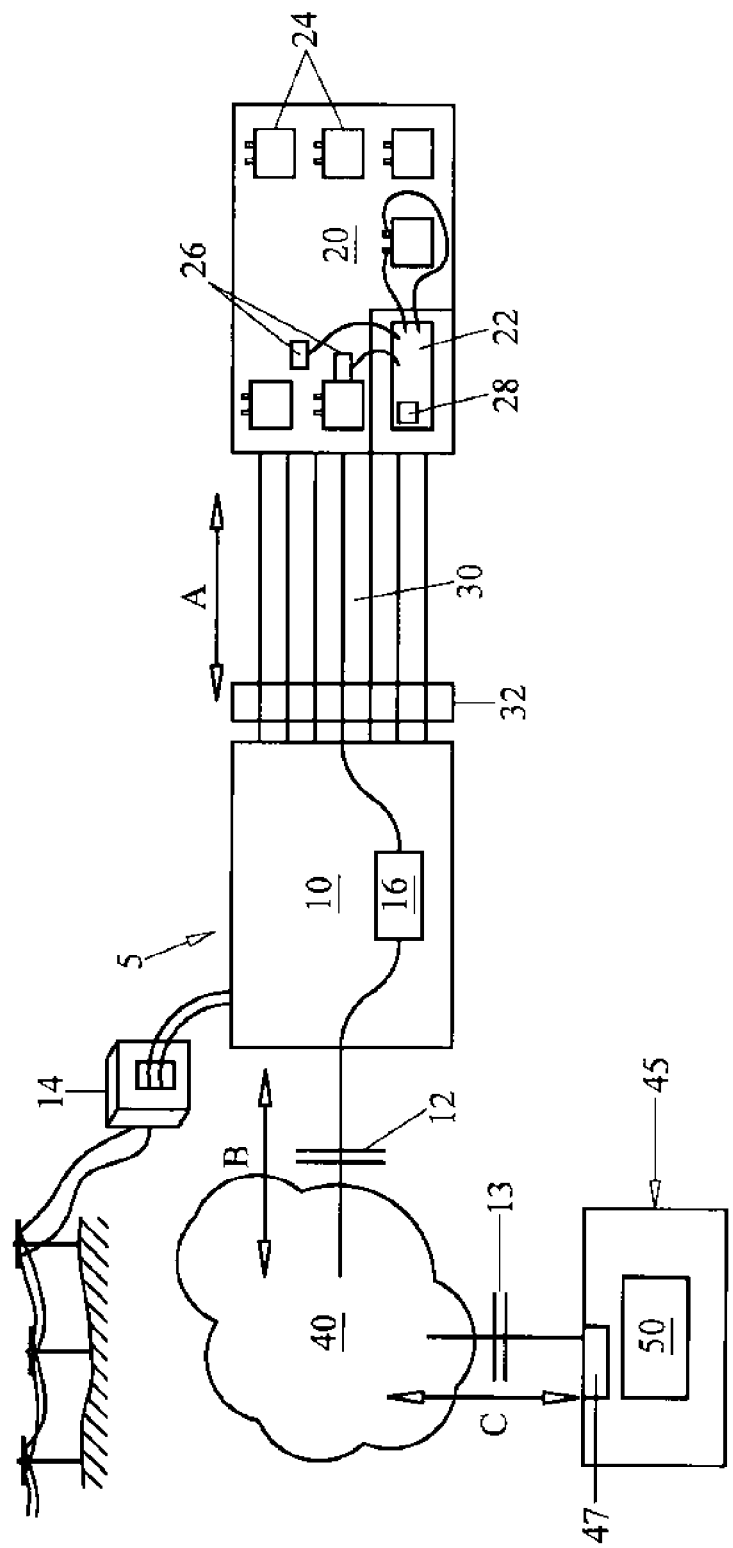
FIG. 1a is a schematic diagram of a remote rechargeable monitoring system 5 in accordance with one embodiment.

As seen in FIG. 1a, a system 5 includes a battery charger 10 to which a battery pack 20 is connected via cables 30 such that the charger 10 is capable of charging the battery pack 20. Such a system can be used to charge electric vehicle batteries, for applications including electric cars, electric fork lifts, other vehicles. The connection is made by way of a plug or connection 32 which can be coupled or decoupled and which completes the electrical circuit for delivery of power and/or information. The battery pack 20 can remain mounted in the vehicle (not shown) during the connection, or it can be removed from the vehicle, for example in a situation in which a surplus battery pack (not shown) is swapped into the vehicle while battery pack 20 is coupled in the system 5 for charging and/or monitoring. The terms "battery" and "battery pack" may be used interchangeably herein to mean either a single battery which may have multiple cells, or multiple batteries one or more of which can have multiple cells.

FIG. 1a also shows a network 40 and a server 45 having an information processor 50 to which the battery charger 10 and battery pack 20 are coupled to facilitate monitoring the operation and condition of the battery pack 20 by the information processor 50 of the server. A communication device 47 effects communication in the server 45. Communicated information is transferred bidirectionally between the battery 20, charger 10, and processor 50. More specifically, the battery 20 can transfer information to the charger 10 via the cables 30 (as described in greater detail herein), as shown by arrow A. The information can then be sent to a network 40, as shown by arrow B, and on to the information processor 50, as shown by arrow C. This direct monitoring of the operation and condition of the battery 20 allows the processor 50 to accomplish a variety of operations relating to the characteristics of the battery, such as determining the current condition of the battery, controlling the operation of the battery and the charging system, providing warnings and alerts to the system operator and other involved parties, analyzing the operational history of the battery, determining maintenance needs of the battery, estimating the life of the battery, evaluating the value of the battery, determining and valuing a warranty for the battery and so on.

The battery charger 10 can be any of a variety of chargers including a conventional charger, an opportunity charger, a fast charger and the like. The charger 10 can be a commercially available charger, including those manufactured by BASSI S.r.l., an Italian corporation located in Fabriago, Lugo (RA), Italy ("Bassi"). The charger 10 is connected to a power source 14, such as a utility, which provides the power to charge the battery pack 20. The charger 10 also includes a communication device 16 that is capable of communicating with both the battery 20 and to the network 40. A counterpart communication device (not shown) is provided on the battery. The system can also include a firewall 12, optionally as part of the charger 10, to protect the communication device 16 and charger from any undesired intrusions originating from the network 40. Another firewall 13 can also be included to protect the server 45. In addition to charging the battery pack 20, the charger may be capable of discharging the battery pack 20, either to other batteries or back to the power source—for example, the utility grid.

The battery pack 20 includes a battery monitor and identifier module 22 (also referred to as battery monitor), coupled to one or more batteries 24. The batteries 24 can be any of a variety of different batteries, including those commercially available from various sources in the market. In part, the module 22 functions to monitor different parameters related to the operation and condition of the batteries 24 and/or overall battery pack 20, including temperature, voltage, amperes, current, time, water level, geographic location (for example in conjunction with a location sensor such as a GPS unit (not shown)) and the like. The module 22 can thus coupled to one or more sensors 26, which may include temperature sensors, voltage sensors, location sensors and the like, to provide values of the measured parameters. Alternatively or in addition, some of these values can be inferred, for example based on current draw through the cables 30 and/or the charger 10, or the like. It should be noted that the sensors are not necessarily dedicated to sensing battery parameters. For instance, ambient temperature has an impact on charge rate and capacity, with higher temperatures adversely impacting these parameters. Thus one or more of sensors 26 can be used to provide an indication of ambient temperature in order to provide better control of the charging operation or other operational aspects of the system.

The module 22 can also include a memory device 28 for storing information representative of the values of the measured parameters, along with an associated of the values to the particular sensors and an identification of the batter. A clock signal (not shown) can be used to index the values stored in the memory 28. The clock signal can be derived from an internal or external clock (not shown). The module 22 is capable of communicating the information that it receives from the sensors 26 and/or has stored within memory device 28 to an external destination, including the information processor 50. The module 22 may be positioned on top of the batteries 24 or otherwise at the top of the battery pack 20, allowing for easier access to the module 22 and reducing the potential for damage to the module 22 when the pack 20 is removed from the vehicle. As mentioned above, the battery pack 20 may be positioned within an electric vehicle or be removed from the vehicle during charging and monitoring. The battery pack 20 may be capable of discharging not only when used with the electric vehicle, but also back through the system 5 and either into another battery pack (not shown) or back onto to the power source 14 or utility grid.

The cables 30 can function not only to deliver power for charging or discharging the battery pack 10, but also for the battery monitor and identifier module 22 to communicate with the communication device 16. This communication can be via a dedicated line or over the same line(s) used for charging or discharging the battery pack 20. The network 40 can be any of a variety of different communication networks including a LAN, WAN, Internet and the like. The information processor 50 functions not only to receive and analyze the information originating from the battery pack 20, but is also capable of utilizing this information to perform a variety of actions with such information, as noted in more detail herein.

Figure 1B:
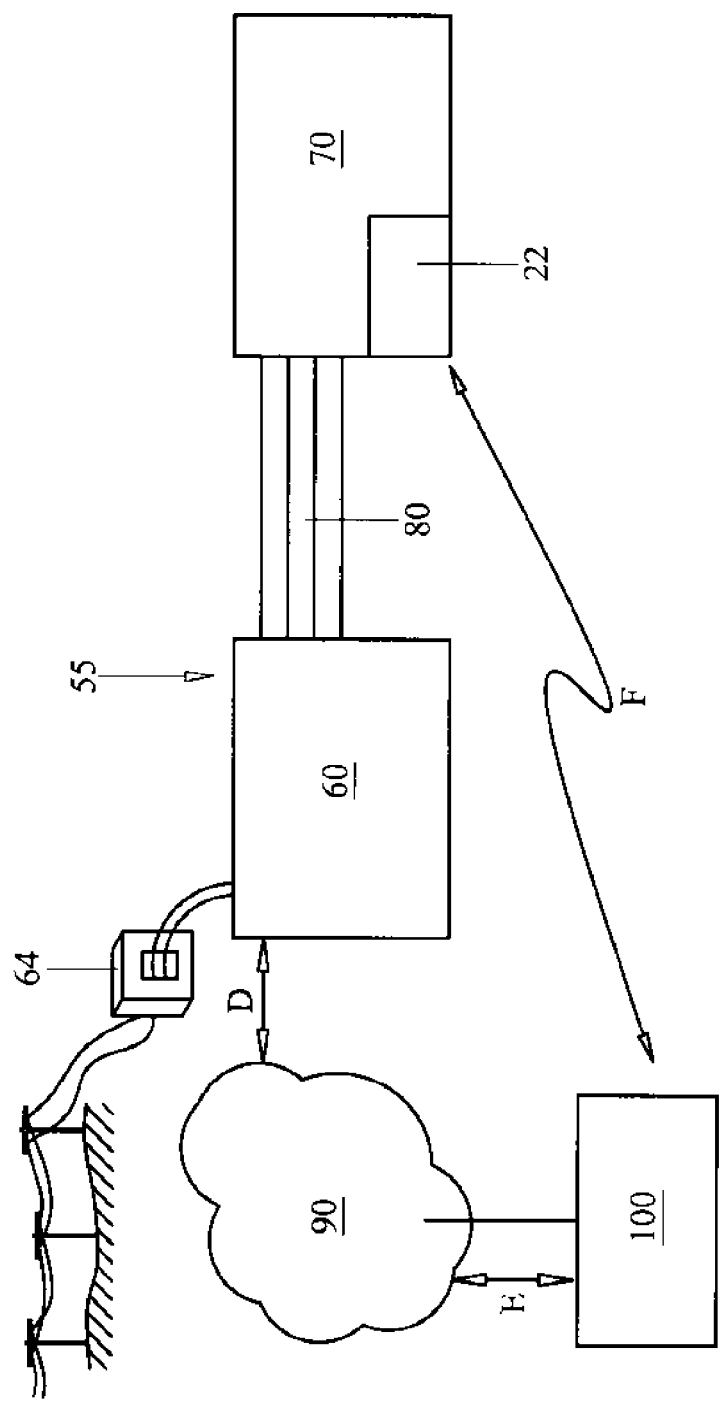
FIG. 1b is a schematic diagram of a remote rechargeable monitoring system 55 in accordance with another embodiment.

FIG. 1b shows a system 55 that includes a battery charger 60, a battery pack 70, connections 80, a network 90 and an information processor 100. Similarly to system 5 above, the battery charger 60 in system 55 is electrically connected to the battery pack 70 via the electrical connections 80 to allow the charger 60 to charge (and discharge) the battery pack 70. However, in system 55, the connections 80 can lack a connection for communicating information between the battery pack 70 and the charger 60. Such a lack of an information connection is typical of many older chargers. To overcome this lack of information connection between the battery pack 70 and the charger 60, the battery pack 70 includes a battery monitor and identifier module 72 capable of wirelessly connecting with the processor 100, as shown by arrow F. Such a wireless connection can be achieved through a cellular connection or a similar connection, such as a WiFi, WiMax, Satellite, or the like. Although the processor 100 can obtain information wirelessly from the battery monitor and identifier module 72, to facilitate other functions, the processor may still be connected to both the network 90 and the charger 60, as shown by arrows D and E. Of course, any of the information connections show in either FIG. 1a or b do not have to have a physical wire connection, but can instead be a wireless connection.

In certain embodiments, the battery monitor and identifier module (e.g. module 22 and/or 72, above) can include an information processor capable of performing some or all of the data processing tasks which would otherwise be performed by the separate information processor (e.g. processor 50 and/or 100, above). Such embodiments allows at least some trigger event (described hereinbelow) determinations to occur at the battery monitor and identifier module, reducing or eliminating the reliance on the communication link between the module and an offsite information processor. While some or all of the information processing may be done by the battery monitor and identifier module in such embodiments, the module may still communicate both the collected and/or otherwise unprocessed data and the processed data to the information processor. Such communication of data to the information processor allows the processor to perform functions such as backing up the data, performing additional processing, sending control commands, issuing alerts/warnings, and the like.

It should be noted that in some embodiments the power lines that supply the power source for the charger (e.g. power source 14 and power source 64), may use commercially available data transfer equipment and may also function as the path (or connection) to the network (e.g. the network 40 and the network 90, such as a LAN, WAN or the Internet).

The information processor such as processor 50 or 100 can utilize the information obtained from the battery monitor and identifier module 22, 72 as either historical and/or real time data, to perform a variety of different functions. As noted above, some of the functions include determining the condition of the battery pack, controlling the operation of the battery pack and the charging system, providing warnings and alerts to the system operator and other involved parties, analyzing the operational history of the battery pack, determining need maintenance of the battery, estimating or predicting the life of the battery, evaluating the value of the battery, determining and valuing a warranty for the battery, analyzing warranty claims for the battery, and the like.

Figure 2:
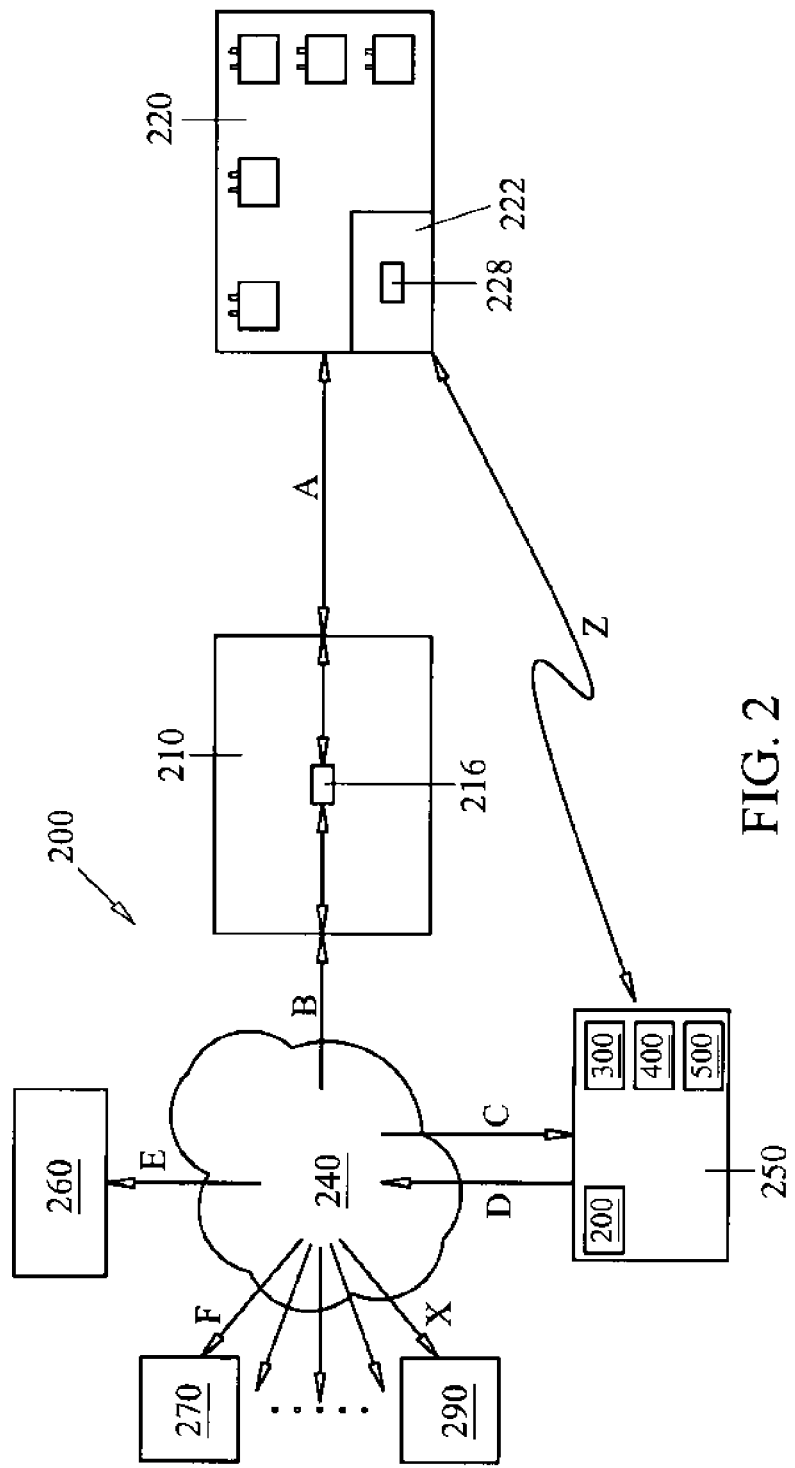
FIG. 2 is a schematic diagram of a remote rechargeable monitoring system 200 in accordance with another embodiment.

FIG. 2 sets forth an arrangement in which a system 200 is shown to operate with any of a variety of different possible functions which an information processor 250 is capable of performing. As shown, the system 200 includes a battery charger 210 which is capable of charging the battery pack 220. The battery pack 220 includes a battery identifier and monitor module 222 having a memory 228. As in the arrangement above, the module 222 records and stores measured values from the batteries of the battery pack 220 and is thus capable of providing both real time data and historical data. This data can be transferred to the information processor 250 by sending through the charger 210, and then across the network 240, as shown by arrows A, B and C. Alternatively, in some embodiments the data can be sent by a wireless connection directly to the process 250, as show by the arrow Z.

After the data is received by the processor 250, any of a variety of different methods can be performed to provide useful output accessible by any of multiple end users 260, 270 through 290, as shown by the arrows D, E, F through X. For example, in at least one embodiment the method performed by the processor 250 includes analyzing the battery operation values provided by the module 222, and, when these values deviate from an acceptable range, sending a notice or alert across the network 240 to an end user 260, such as the system operator or floor manager. Other examples of the methods which may be performed by the processor 250 are set forth below. In this manner, by being able to constantly receive not only real time operation data but also a historical operation data from the battery pack 220, the system 200 can provide a wide variety of useful data to a multitude of different users.

Processor 250 can also function to back up the data provided by the module 222, either within itself, using a memory device 252, and/or at some other location to which it is connected to via the network 240. Also the processor 250 may use such back up data and/or other identifier (such as a token) to check the integrity of the data being stored on the module 222. Such a check would function to prevent the corruption of data stored on the module 222. In the event that such data corruption is identified by the processor 250, then the processor can use backed up data to restore the memory of the module 222 with uncorrupted data.

It should be noted that while described in terms of a single battery, the embodiments herein contemplate the monitoring of multiple batteries. Thus the servers/information processors 45, 50, 100, 250 receiving the operational information of the batteries can associate the information with different batteries and store the information as part of a profile of each battery for tracking as necessary. Further, the batteries can be grouped for association with different users, which can be enterprises such as warehouses running fleets of electric forklifts, or rental car companies or trucking companies running fleets of electrical vehicles that are periodically charged. The individual users or enterprises can then gain access to their individual profiles remotely through the network (40, 90, 240) in order to monitor the conditions and usage of their batteries and their vehicles. Battery characteristics generated can thus be viewed, following proper authentication and authorization, by the users; alternatively, battery characteristic information, such as alerts and warnings, can be sent to the users through cellular networks, WiFi and other modes.

As described herein, monitoring and control of various aspects of operation, including processes which utilize battery operation data provided by the battery identifier and monitor module to control the operation of various subsystems such as the charger and the electric vehicle systems are envisioned.

Figure 3:
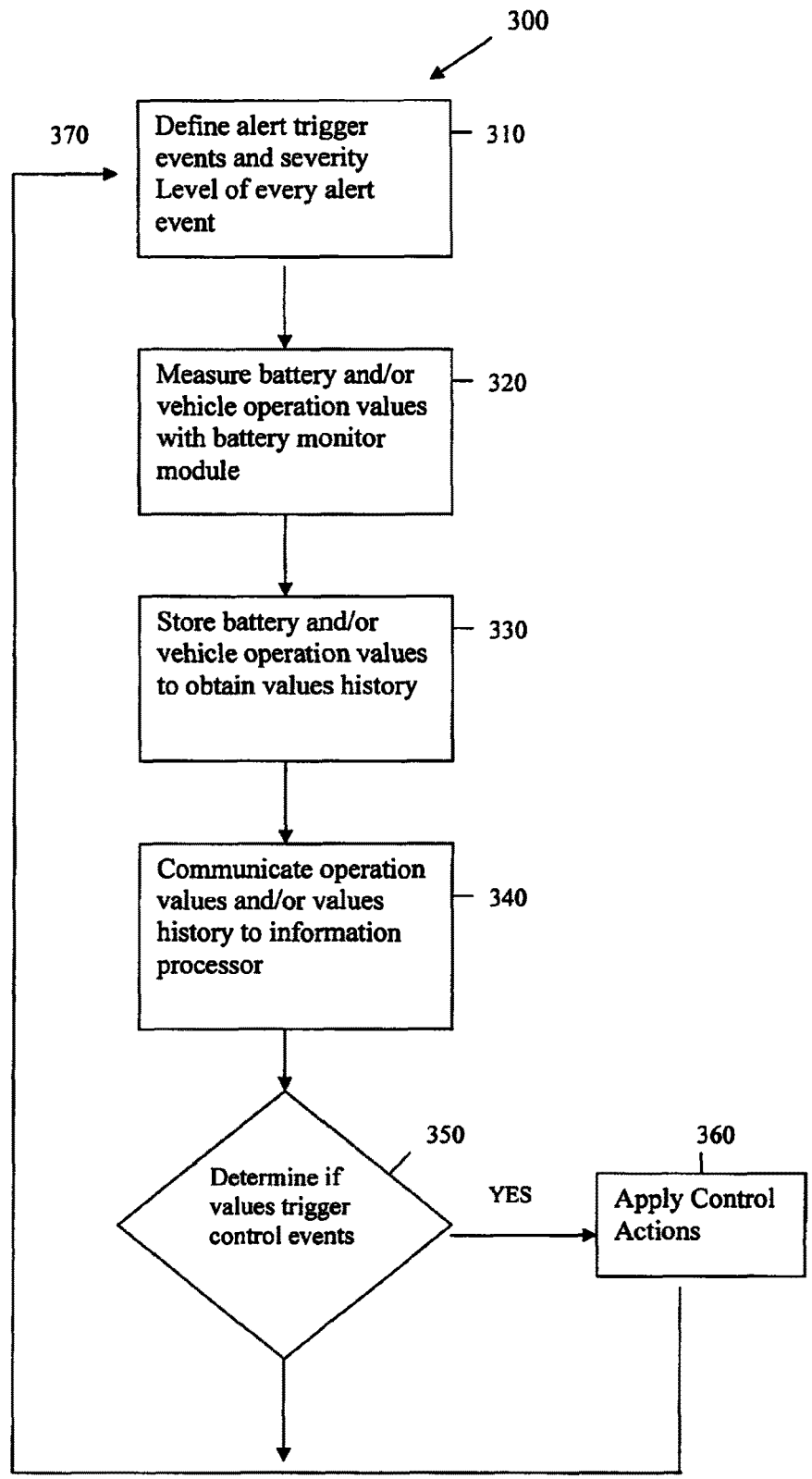
FIG. 3 is a flow diagram showing one specific method for operation control.

FIG. 3 is a flow chart of one specific method for operation control. The control method 300 includes: defining, at 310, control trigger events and associated control actions; measuring, at 320, battery and/or vehicle operation values with the battery identifier and monitor module; storing, at 330, battery and/or vehicle operation values to obtain values history; communicating, at 340, operation values and/or values history to the information processor; determining, at 350, if values trigger control events; and applying, at 360, control actions if necessary. Also shown is a return path 370 which causes the steps after step 320 to continue to repeat to cause a continuous monitoring and control of the operation of the battery pack, charger, electric vehicle systems, or the like.

The control trigger event or events defined at 310 above can be any of a variety of conditions, and the associated control actions could likewise be any of a many actions related to eliminating the trigger event. For example, the trigger event could simply be a temperature level of the battery pack, and associated control action could include operating a cooling fan on the pack or in the electric vehicle that the pack is located in, or the action could be controlling the operation of the charger to reduce or stop the charging of the battery pack while the pack is allowed to cool down. Another example of a trigger even is low water level, in a battery or a battery cell, and the associated control action would then be the addition of water to the battery.

The measurement of battery and/or vehicle operation values at 320 may use a battery identifier and monitor module different from that set forth above as the module 22, 72 or 222. This difference will be that the module will not only also be capable of monitoring and recording events in the battery and vehicle but also that the module may be capable of taking commands received from the information processor (50, 100) and server and to control various operational aspects of the vehicle as function of the received commands. Some of the operational aspects that may be controlled using such vehicle command information may include operation of the vehicle's cooling and fans, hydraulic systems, ignition and the like, in order to address the control actions discussed above, for instance. In addition, the information processor and server can issue charger command information to the battery charger to control operational aspects of the charger, for example, during charging, controlling the amount of voltage and/or current applied, and/or the rate at which these are applied. In one embodiment, the battery charger 10, 60 can be configured to deliver fluid to the battery, and the control commands from the server can control the fluid rate and direct the fluid selectively to depleted cells for replenishment thereof.

In embodiments where the battery identifier and monitor module can provide the location of the battery (e.g. via a GPS sensor or the like), a trigger event for an operation command can be the battery being moved outside of a given geographic location. This allows an operation command to be issued that would restrict the movement of the vehicle within which the battery is disposed to a predetermined geographical area. For example, if the vehicle is stolen and removed from a defined geographic area, a command could be issued to shut down the operation of the battery of the vehicle, and thus the operation of the vehicle (and report back the current location of the vehicle to allow for recovery of the vehicle by the authorities).

It may also be desirable to provide warnings and alerts to the system operator and/or other involved or interested parties, represented for example by blocks 260-290 in FIG. 2. Such warnings or alerts would be based upon the measured operation values of the battery pack and/or electric vehicle. Use of a network, such as the Internet, as shown in FIGS. 1a, 1b and 2, allows issuance of such alerts potentially to a party anywhere in the world. Also, the system allows the controlling of level of the alert such that the persons receiving the alert can be varied by the severity of alert, in an escalation paradigm. The alerts can be based on actual events or using a stored history of events, on a prediction of an event. Thus an alert can be sent to a first recipient, and if no response is undertaken, in the form of a corrective measure such as modification of driving behavior to reduce battery wear, then an alert is sent to a second recipient, such as a supervisor. Alternatively, the first recipient can be the vehicle lessee, and the second can be the leasor.

Figure 4A:
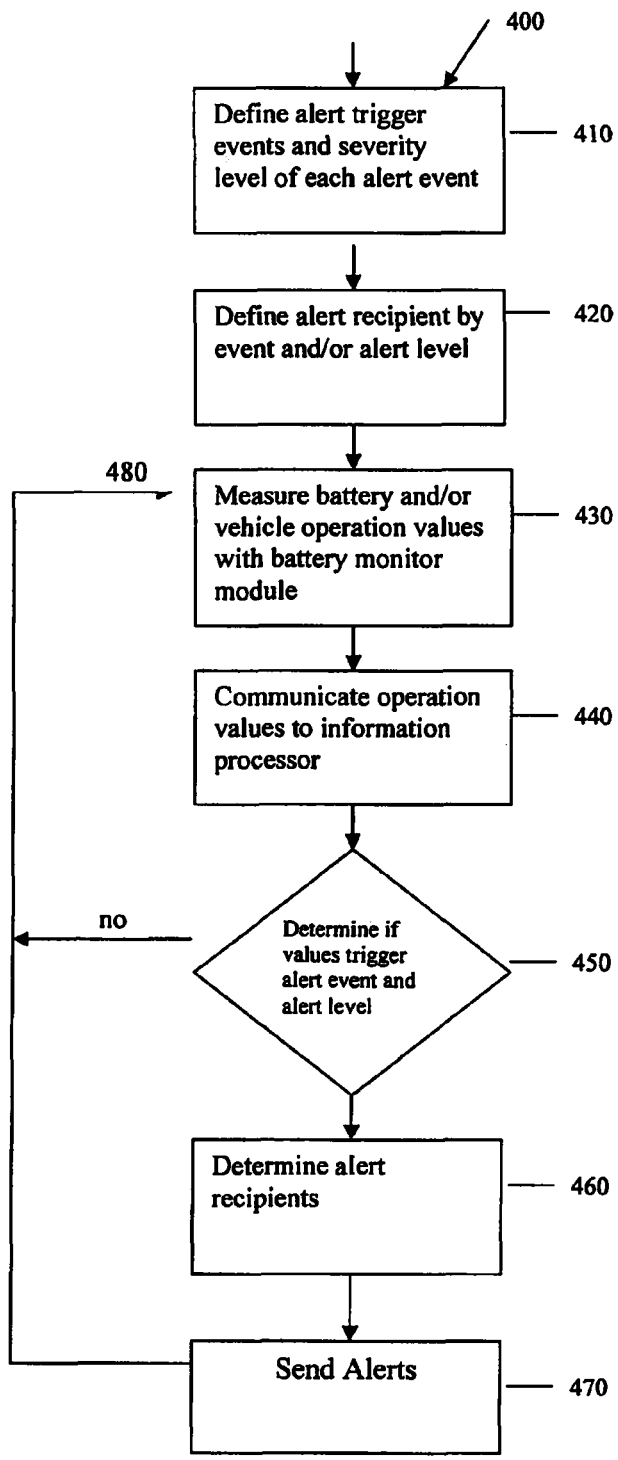
FIG. 4a is a flow diagram of a method 400 for issuing alerts.

As shown in FIG. 4a, one embodiment of a method 400 for issuing alerts includes: defining, at 410, the alert trigger events and the severity level of each alert event; defining, at 420, the alert recipient by event and/or by alert level; measuring, at 430, the battery and/or vehicle operation values with battery monitor module; communicating, at 440, operation values and/or values history to the information processor; determining, at 450, if values trigger alert events; determining, at 460, alert recipient(s) 460; and sending alerts, at 470. Also shown is a return path 480 which shows the steps after step 430 as continuing to repeat, to cause a continuous monitoring of the operation of the battery pack and electric vehicle systems. It should be noted that the operation alert method(s) may be used in conjunction with the operation control method(s) set forth herein.

Figure 4B:
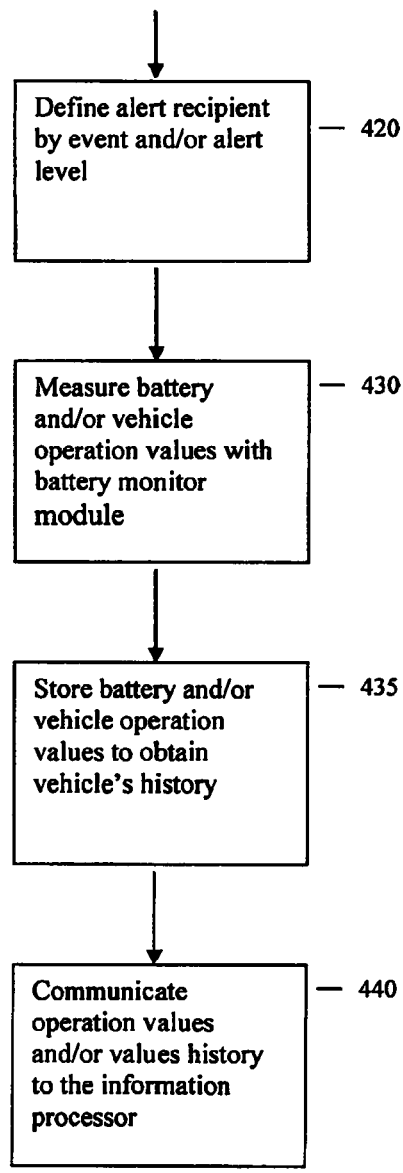
FIG. 4b is a flow diagram showing the inclusion of a step of storing the battery and/or vehicle operation values to obtain an operation history.

The alert trigger events defined at 410 above may include lack of action taken in response to a previous alert, or improper action, by the operator of the system after an initial, or series, of prior alerts being issued. For example, an initial alert could be issued warning the operator that the battery pack is exceeding a temperature limit, with the instruction to reduce or terminate the charging of the battery pack. If no action is taken in a given time then a follow-on alert event could be issued to further warn the operator. In fact, this follow-on alert event could have a different alert level associated with it so that additional recipients would be included with the issuance of the follow-on alert. For example, if the operator ignores the initial alert which was only sent to him, then a follow-on alert could be issued at a higher level and be also sent to a shop floor supervisor. To facilitate follow-on alerts, the operation alert method 400 may also include a step of storing the battery and/or vehicle operation values to obtain an operation history 435, as shown in FIG. 4b, and the step of communicating the operation values 440 be modified to also include sending the value history 440'.

In addition to the operator, shop floor supervisor, or the like, alerts can be sent to other interested parties such as a battery dealer or resaler to address warranty issues for instance, as describe below.

In certain embodiments, the trigger event or events are related to the maintenance and/or repair of the battery. In such cases the alert that is generated is sent to the entity defined to do the maintenance and/or repair of the battery. In one embodiment, the alert is first sent to a website to record and list the maintenance and/or repair required for the purpose of allowing one or more entities to bid upon doing the respective maintenance/repair work, allowing the battery owner or operator to select the desired entity from their respective bids (e.g. select the lowest bidder). The bid may include not only the expected cost for the work, but also the estimated time to complete the work, or similar expected aspects of the work. In embodiments where the information known or provided by the battery module or information processor includes the physical location of the battery, then the website could filter the posting of the needed maintenance/repair to certain geographic areas, and/or filter those entities who are allowed to view and/or bid on the maintenance/repair work (e.g. only allow those entities who are reasonably close enough to the physical location of the battery to bid on the work. Providing the physical location of the battery needing maintenance/repair will allow the bidding entity to be better informed in making a proper bid for the work.

In embodiments where the battery module can provide the location of the battery (e.g. via a GPS sensor or the like), the trigger event for an alert can be the battery and/or the vehicle in which it is mounted being moved outside of a given geographic location. This allows the alert that is sent to indicate that the vehicle in which the battery is disposed is being operated in an unauthorized manner—for example, that it has been stolen.

It is also contemplated conduct monitoring and maintaining a warranty on the battery. Because the battery monitor and identifier module 22, 72, 222 is capable of providing the information processor with information regarding the condition and use of the battery pack 20, 70,220 over a period of time (including over the entire life of the battery), various functions relating to the battery pack's warranty, including the ability to dynamically vary the terms and conditions of the warranty, can be implemented. For example, if the battery pack 20, 70, 220 is operated in a manner such that its temperature is kept consistently below levels that would otherwise damage the pack, then utilizing this information, the term of the warranty can be extended from its initial term. However, if the data shows that the pack is operated at temperatures above certain limits, then the warrant term can be reduced or voided.

Figure 5:
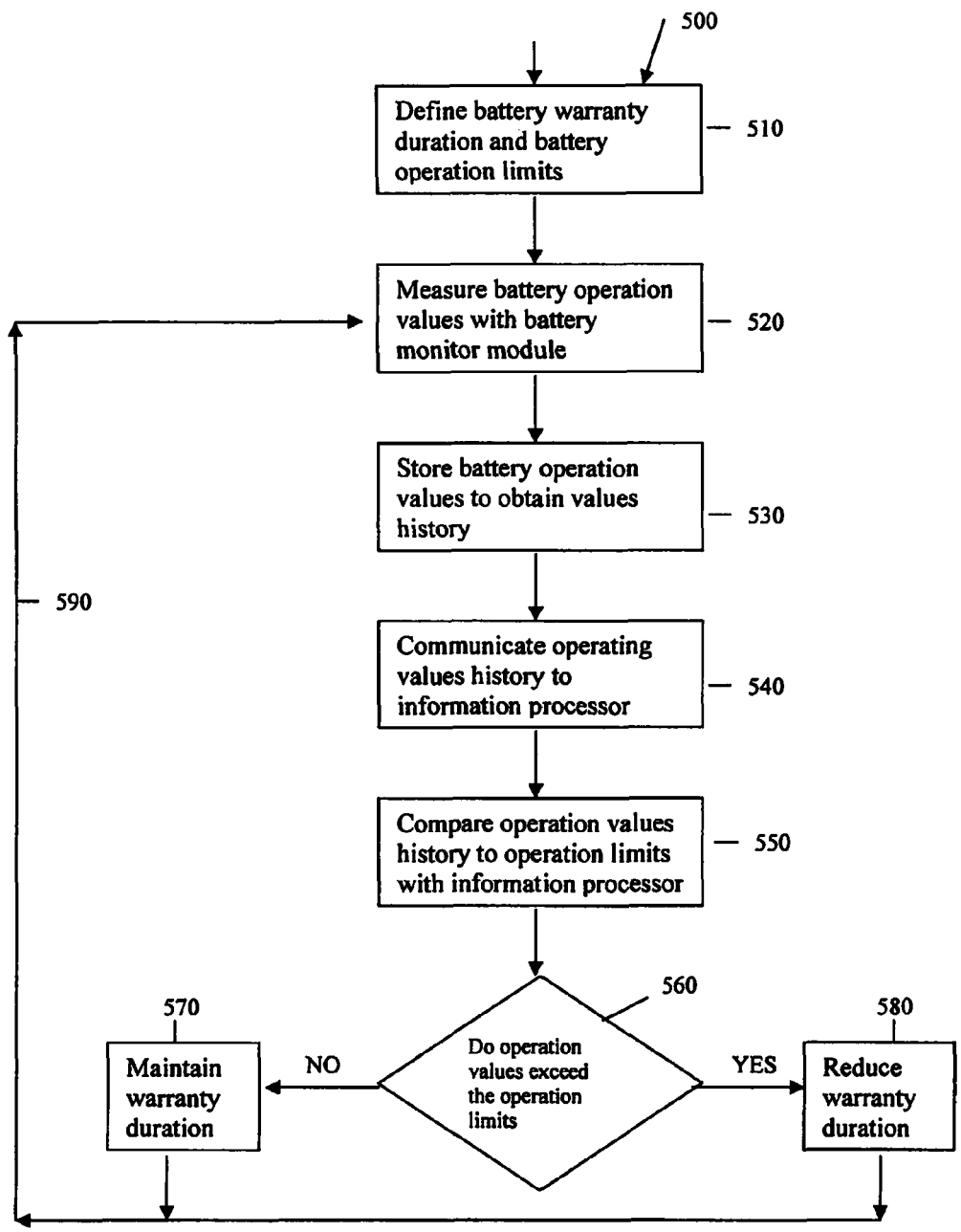
FIG. 5 is a flow diagram of another method in accordance with one embodiment.

As shown in FIG. 5, in at least one embodiment a method 500 includes: defining, at 510, battery warranty duration and battery operation limits; measuring, at 520, battery operation values with battery monitor module; storing, at 530, battery operation values to obtain battery values history; communicating, at 540, operation value history to information processor; comparing, at 550, operation values history to operation limits with information processor; determining, at 560, if operation values exceed operation limits; maintaining warranty during at 570 if they do not; reducing, at 580, warranty duration if they do; and returning, at 590, to measuring the operation values (520).

Method 500 may be used in conjunction with the issuance of alerts, as set forth in alert method 400, to send alerts to the interested parties regarding the status of the battery warranty. Such interested parties could include the operator, the system owner, the battery dealer, the battery manufacturer, and the like.

Another embodiment of the warrant method 500 can be used for determining the current life and/or value of the battery pack based upon the values measured and recorded by the battery monitor and identifier module 22, 72, 222. This provides the benefit of informing interested parties of the up-to-the-minute life and value of the battery pack 20, 70,220. Like with the warranty methods, the valuation methods are based upon the events (generally adverse) that occur to the battery over time. For example, for a battery pack that has been repeatedly over-heated during charging cycles, its remaining life, and thus its current value, will be less compared to a battery pack that has been operated below damaging temperature levels. The life and the value of the battery pack can be based exclusively on prior history or, additionally or in the alternative, on a prediction of expected use. The battery life and value determination methods can function with other methods to provide additional functions such as alerting the interested parties of the change in value of the battery pack. Further, with a connection to a network, such as the Internet, as described above, the method may use information obtained from a used battery market to aid in the determination of the current value of the battery pack.

Figure 6:
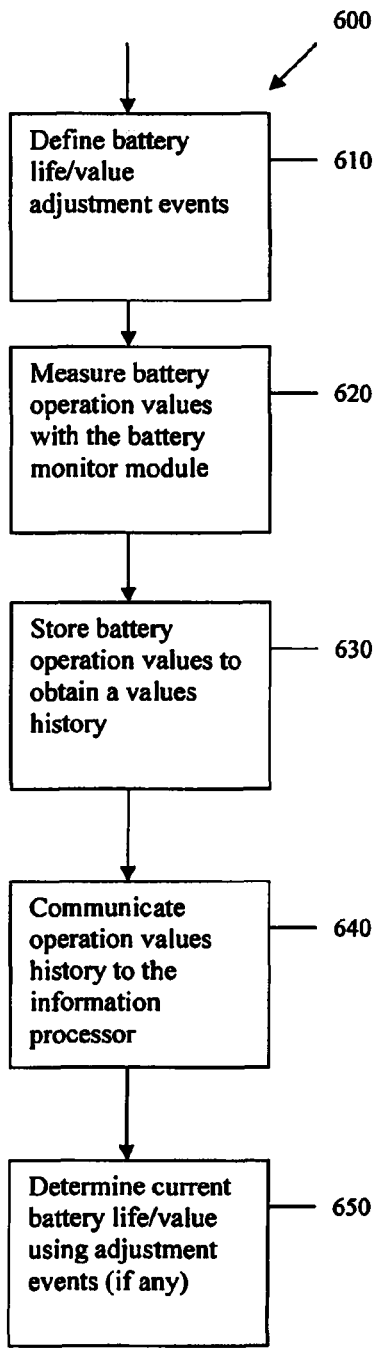
FIG. 6 is a flow diagram showing a method 600 for battery value determination.

FIG. 6 shows a method 600 for battery value determination. This method includes: defining, at 610, battery life and/or value adjustment events; measuring, at 620, battery operation values with the battery monitor module; storing at 630, the battery operation values to obtain a values history; communicating at 640, the operation values history to the information processor 640; and determining, at 650, the current battery life and/or value using adjustment events.

As noted above, in certain embodiments, the battery monitor and identifier module (e.g. module 22, 72 and/or 222, above) includes an information processor which is capable of performing some or all of the data processing tasks which would otherwise be performed by the separate information processor (e.g. processor 50, 100 and/or 250, above). Such an embodiment allows at least some of the trigger event determination of the operation methods set forth herein to occur at the battery module, reducing or eliminating the reliance on the communication link between a battery module and an offsite information processor. While some or all of the information processing may be done by the battery module in such embodiments, the battery module may still communicate both the collected or otherwise unprocessed data and the processed data to the information processor. Such communication of data to the information processor allows the processor to perform functions such as backing up the data, performing additional processing, sending control commands, issuing alerts/warnings, and the like. With some or all of the data processing being done by the battery module, the order of the steps of the method may be rearranged such that the communication occurs after the processing of the information (and the information processing step would include some or all of the processing being done by the battery module).

In certain embodiments, one or more of the operation methods set forth herein could be performed together or otherwise concurrently. For example, one or more of the operation control methods could function in conjunction with one or more of the operation alert/warning methods, such that not only is a corrective action taken after a trigger event, but an alert to the operator is also issued.

It is also contemplated that the system described herein will conduct intelligent charging of the battery pack 20, 70, 220. Specifically, the system 200 for instance can include services such as maintaining one or more user-specific accounts, tailored for individual consumers. The owner of a private vehicle in this situation would have a user profile stored in the system, along with account information. The system tracks charge sessions by the individual, including the time, location and quantity of charge (amps/power), and would debit the individual's account accordingly. Battery charging conducted late at night for instance would incur lower cost than those at peak times; those conducted from certain preferred sites would be cheaper than those at other sites, with site determination being conducted based on GPS signals provided from the battery identifier and monitor module 22, 72 or 222, or from the location of the charger or the station at which the charger is disposed, or through other means.

In one embodiment, battery monitor and identifier module 22, 72, 222 is capable of providing the server and information processor 50, 100, 250 with information regarding not only the battery pack 20, 70,220 itself, but also regarding the vehicle in which it is mounted, or even the environment of the vehicle and/or battery. In the case of the environment of the vehicle and/or battery, it may be possible to sense phenomena such as gas leaks, with the battery monitor and identifier module 22, 72, 222 being equipped with a suitable sensor 26 to perform this function. When such a gas leak is sensed, an indication of same is sent to the server and processor 50, 100, 250 either wirelessly or by way of the battery charger and/or network. In response, measures can be taken to contain any damage, by example shutting down the vehicle and/or charger. Such measures are not restricted to the vehicle and/or battery that sensed the condition (gas leak). Rather, particularly in the case of a fleet application in a warehouse for instance, all vehicles can be automatically shut or batteries disconnected in response. The measures can be taken automatically—for example, commands are issued from processor 50, 100 and/or 250 to shut down the vehicles, these commands being sent in the reverse direction, either wirelessly or by way of the network and charger. Alternatively, the commands can be based on human intervention, elicited based on alerts sent to a shop supervisor, emergency response personnel, or others.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A battery charging system comprising:
    a processor in communication with a network device;
    a battery charger comprising a communication device, wherein the communication device is in communication with the processor via the network device;
    a battery pack comprising:
        one or more battery cells;
        one or more sensors, including a first sensor for sensing a parameter of at least one of the one or more battery cells; and
        a battery monitor in communication with the one or more sensors and the communication device of the battery charger, the battery monitor includes a memory for storing an indication of the sensed parameter, wherein the battery monitor is configured to receive the sensed parameter from the one or more sensors during operation of the battery pack,
        wherein the battery monitor is configured to send an indication of the sensed parameter to the processor via the communication device of the battery charger and the network device, and
        wherein the indication operates as a trigger event to cause the processor to perform two or more of determining the condition of the battery pack, providing warnings and/or alerts to an operator or user, analyzing the operational history of the battery pack, determining need for maintenance of the battery pack, estimating or predicting the life of the battery pack, evaluating the value of the battery pack, determining and valuing a warranty for the battery pack, and analyzing warranty claims for the battery pack.

2. The battery charging system of claim 1, wherein the processor is a remote processor.

3. The battery charging system of claim 1, wherein the remote processor is a server.

4. The battery charging system of claim 1, wherein the battery monitor is in communication with the communication device of the battery charger by way of a charging cable configured to also charge the battery pack.

5. The battery charging system of claim 1, wherein the battery monitor is in wireless communication with the communication device of the battery charger.

6. The battery charging system of claim 1, further comprising a second sensor for sensing a non-battery parameter.

7. The battery pack of claim 6, wherein the battery monitor is configured to communicate the indication of the sensed non-battery parameter to the processor.

8. The battery charging system of claim 1, wherein the sensed parameter is selected from temperature, voltage, current, time, water level, and geographic location.

9. The battery charging system of claim 1, wherein the processor is configured for processing the indication of the sensed parameter.

10. The battery charging system of claim 9, wherein the battery monitor is configured to communicate the indication of the sensed parameter to a remote device after processing by the processor.

11. The battery pack of claim 1, wherein upon receiving the communicated indication, the remote device is configured to control an operation of the battery, an operation of a battery charger associated with the battery, or an operation of a vehicle associated with the battery.

12. The battery charging system of claim 1, wherein the processor is operable to receive indications of sensed parameters from a plurality of battery monitors each associated with a different battery pack.

13. A method for monitoring the operation of a battery pack having one or more battery cells, the method comprising:
    sensing a parameter of at least one of the one or more battery cells using one or more sensors within the battery pack;
    storing the sensed parameter from the one or more sensors within a communicatively coupled battery monitor, wherein the battery monitor is also located within the battery pack;
    sending the sensed parameter to a battery charger comprising a communication device, wherein the communication device is in communication with the battery monitor;
    receiving instructions from the communication device to instruct the battery monitor to
    perform two or more of determining the condition of the battery pack, providing warnings and/or alerts to an operator or user, analyzing the operational history of the battery pack, determining need for maintenance of the battery pack, estimating or predicting the life of the battery pack, evaluating the value of the battery pack, determining and valuing a warranty for the battery pack, and analyzing warranty claims for the battery pack.

14. The method of claim 13, wherein the communication device is communicatively coupled to a processor of a server, wherein the processor sends the instructions to the communication device.

15. The method of claim 13, wherein the battery charger comprising a communication device is further configured to receive a second indication of a second sensed parameter from a second communicatively coupled battery pack.

16. The method of claim 14, wherein the battery monitor is in communication with the communication device of the battery charger by way of a charging cable configured to also charge the battery pack.

17. The method of claim 13, wherein the battery monitor is in wireless communication with the communication device of the battery charger.

* * * * *